Feb. 2, 1926.  
W. F. STIMPSON  
1,571,306  
STEELYARD ROD AND SPRING CONNECTION FOR SCALES  
Filed Oct. 3, 1923  2 Sheets-Sheet 1

Inventor  
Walter F. Stimpson

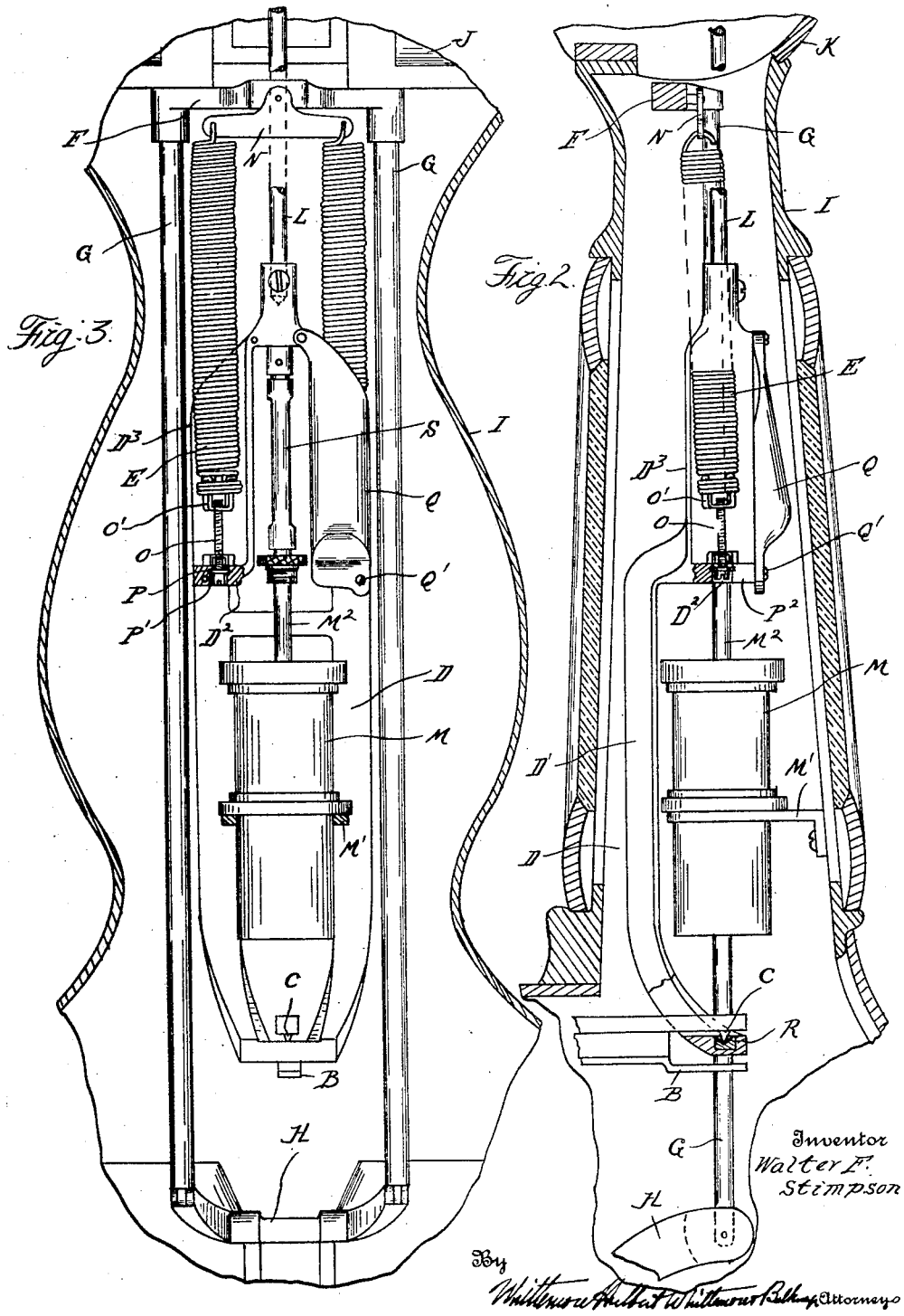

Patented Feb. 2, 1926.

1,571,306

UNITED STATES PATENT OFFICE.

WALTER F. STIMPSON, OF LOUISVILLE, KENTUCKY.

STEELYARD ROD AND SPRING CONNECTION FOR SCALES.

Application filed October 3, 1923. Serial No. 666,398.

*To all whom it may concern:*

Be it known that I, WALTER F. STIMPSON, a citizen of the United States of America, residing at Louisville, in the county of Jefferson and State of Kentucky, have invented certain new and useful Improvements in Steelyard Rod and Spring Connections for Scales, of which the following is a specification, reference being had therein to the accompanying drawings.

The invention relates to spring scales and more particularly to that type in which the platform levers are connected to the weighing springs and indicator through the medium of a steelyard rod connection. The invention consists in various features of construction including the means for equalizing the tension on the springs, the means for quickly detaching the springs and for adjusting the tension thereof, the construction and arrangement of the steelyard rod in relation to the dash-pot, including an offset portion for providing clearance for the dash-pot, and a counterweighted portion for balancing said offset portion. Other features of improvement will be more specifically hereinafter referred to.

In the drawings:

Figure 2 is a sectional side elevation of the steelyard rod and spring connection;

Figure 3 is a rear elevation thereof.

Figure 1:
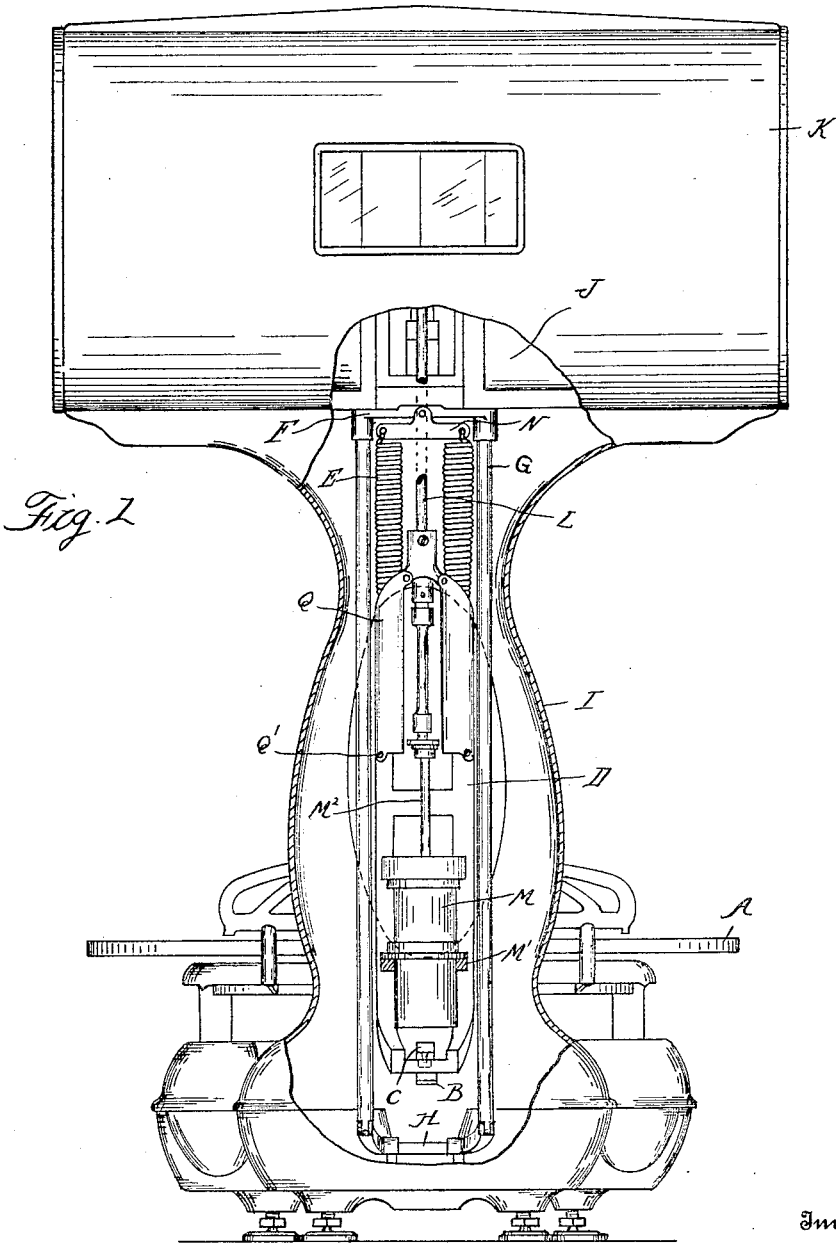
Figure 1 is a sectional rear elevation of a scale to which my improvements are applied.

A is the weighing platform of a scale, B the end portion of the platform levers which is provided with a point bearing C for engaging the lower end of the steelyard rod D. E are the weighing springs attached to the upper portion of the steelyard rod, and F is a cross bar from which the springs are suspended and which in turn is supported on vertically extending parallel rods G rising from the base. The lower ends of these rods are supported on a rockable member H by which they may be raised or lowered to change the adjustment of the scale. I is a hollow pedestal enclosing the parts just described. J is an indicator shown as a revoluble cylinder which is journaled within a housing K supported on the pedestal. L is an extension of the steelyard rod for actuating the indicator by suitable connections (not shown).

To check the oscillations of the scale, it is usual to employ a dash-pot such as M which is supported on a shelf M' within the hollow pedestal. It is desirable to arrange this dash-pot in axial alignment with the center line of the steelyard and to this end the steelyard rod D has an offset portion D' to provide clearance for said dash-pot. The steelyard is also preferably formed of two parallel offset bars centrally connected to each other at their lower and upper ends and spaced from each other to provide additional clearance for the dash-pot. The weighing springs E are attached at their upper ends to an equalizing lever N which is centrally pivoted to the cross bar F, the latter being centrally offset so as to permit said equalizing lever to lie in the central plane of the rods G. The lower ends of the springs are attached to the upper portion $D^2$ of the offset D' so as to also lie in the central plane of the rods G. In order that the springs may be quickly attached to or detached from the steelyard, I have provided a connection consisting of the screw O, which engages a threaded anchor O' secured to the lower convolutions of the spring. This screw O is headed at its lower end to bear against a washer or collar P engaging a recess P' in the member $D^2$. There is also a slot $P^2$ connecting with the recess, which is of sufficient width to pass the shank of the screw. Therefore, to disengage the screw, the head and washer P are depressed to drop out of the recess, after which the shank may be drawn out through the slot.

Above the portion $D^2$ the steelyard rod is provided with upward extensions $D^3$, which are curved in cross section to partially surround the springs. Complementary to these portions $D^3$ are detachable members Q which are on the opposite sides of the center from the offset D' and are sufficiently weighted to partially counterbalance the unbalancing effect of said offset. The portions Q are secured by screws Q' engaging the end of the portion $D^2$ and thereby closing the slot $P^2$. By removing these screws Q' the portions Q may be readily detached to permit of disengaging the springs. At the lower end of the steelyard rod there is arranged a cup-shaped bearing block R for engaging the point C, being preferably an agate bearing, or other hard material.

With the construction as described the tension of the springs E is maintained at all times equal by the pivoted lever N. By adjusting the screws O the tension of the springs may be altered as desired and if it is necessary to detach the steelyard rod, this may be easily accomplished by first removing the counterweighted plates Q and then disengaging heads of the screws and washers P from the recesses P', as before described. The dash-pot M has its shank M² coupled to a depending rod S, which is pivotally attached to the upper end of the steelyard rod and as this rod is arranged in the central plane of draft, there is little tendency to bind.

What I claim as my invention is:

1. In a scale, the combination with a dashpot, of a steelyard rod comprising a member having an offset portion to provide clearance for the dash-pot, and a portion on the opposite side of said offset and out of registration therewith for counterbalancing the same.

2. In a scale, the combination with a dashpot, of a steelyard rod comprising a member having a portion offset to provide clearance for the dash-pot, of weighing springs attached to the upper end of said offset portion, and a member extending upward from the points of attachment of said spring on the opposite side from said offset to form a counterbalance for the same.

3. In a scale, the combination with a dashpot, of a steelyard rod comprising parallel connected bars offset to provide clearance for the dash-pot, springs attached to the upper portion of said offset in the plane of the respective bars, and members secured to said bars on the opposite side of said offset to counterbalance the same.

4. In a scale, the combination with a dashpot, of a steelyard rod comprising a pair of spaced bars cross connected at their ends and having centrally of the lower end a pivot point bearing for the platform lever, and an aligned central connection at the upper end for the dash-pot, the lower portion of said bars being offset to provide clearance for the dash-pot, a pair of weighing springs secured to said bars of the upper end of said offset portion, and members secured to said bars adjacent to said springs and upon the opposite side from said offset for counterbalancing the latter.

5. In a scale, the combination with a dashpot, of a steelyard rod comprising a pair of spaced bars cross-connected at their ends and having a central pivot pin bearing at the lower end for the platform and a central rod connection depending from the upper end for engaging the dash-pot plunger, said bars having their lower portions laterally offset to provide clearance for the dash-pot and their upper portions fashioned to form channel housings for the weighing springs with slotted anchor lugs for said springs at the lower ends of said channel housings, headed anchor members for the springs engageable with said slotted lugs, and members forming complementary portions of the channel housings detachably secured to said bars closing the slots in said lugs and forming counter-weights for the offset portion of the bar on opposite sides of the central plane of the rod.

6. In a steelyard rod for scales, an anchor connection for the weighing spring comprising a slotted lug having an enlarged countersunk recess, and a spring shank engageable with said slot and having the head for engaging said countersunk recess.

7. In a steelyard rod for scales, an anchor connection for the weighing spring comprising an anchor lug having an entrance slot therein, and a countersunk enlarged recess on the lower side thereof, an anchor nut engaging the spring, a screw-threaded shank adjustably engaging said anchor nut and adapted to pass laterally through the slot in said lug, and a head for said shank engageable with said countersunk recess.

8. In a scale, the combination with a steelyard rod connection comprising spaced cross-connected bars, of a pair of weighing springs respectively attached to said bars, an anchor member for said weighing springs, and an evener lever centrally pivoted to said anchor member and having its opposite ends attached to said springs.

9. In a scale, the combination with a steelyard rod, of a pair of weighing springs having their lower ends attached to said steelyard rod, a pair of vertical rods on opposite sides of said steelyard rod and weighing springs, a cross bar at the upper ends of said rod forming an anchor for said springs, and an evener lever connected to the upper ends of said springs and centrally connected to said cross bar.

10. In a scale, the combination with a steelyard rod, of a pair of weighing springs having their lower ends attached to said rod, a pair of vertical bars on opposite sides of said steelyard rod and weighing springs and substantially in the plane of the latter, a cross bar supported on the upper ends of said rods and offset centrally therebetween, and an evener lever attached to the upper ends of said springs, centrally pivoted to the offset portion of said cross bar.

In testimony whereof I affix my signature.

WALTER F. STIMPSON.